Patented Mar. 27, 1951

2,546,169

UNITED STATES PATENT OFFICE 2,546,169

EMULSION PROCESS

Victor S. Salvin, Irvington, and John R. Adams, Jr., Summit, N. J., assignors to Celanese Corporation of America, a corporation of Delaware No Drawing. Application September 2, 1948, Serial No. 47,537

14 Claims. (Cl. 260—309.6)

This invention relates to the production of organic compounds and relates more particularly to an improved process for the production of 1,3-diazacyclo compounds.

An object of this invention is to provide an improved process for the production of 1,3-diazacyclo compounds by the reaction of an aldehyde with an N,N'-mono-substituted polymethylene diamine.

Another object of this invention is the production of 1,3-diazacyclo compounds wherein the reaction is effected in an aqueous medium and without the use of volatile solvents to solubilize the reactants.

Yet another object of this invention is the production of 1,3-diazacyclo compounds by reacting an aldehyde with an N,N'-mono-substituted polymethylene diamine, which compounds are free of unreacted diamine.

A further object of this invention is the provision of an improved process for the production of 1,3-diphenylimidazolidine wherein formaldehyde is reacted with N,N'-diphenyl ethylene diamine.

Other objects of this invention will appear from the following detailed description.

In the production of 1,3-diazacyclo compounds wherein a substituted polymethylene diamine is reacted with an aldehyde, the reaction is usually carried out in solution in an organic solvent medium. The use of an organic solvent medium, however, not only requires the use of explosion-proof equipment since the reaction is usually effected at temperatures above the boiling point of the organic solvent, but a solvent recovery system is also essential in order to make the reaction economically feasible. An efficient and economical process wherein the explosion hazard is eliminated and the need for a solvent recovery system avoided would render the production of said 1,3-diazacyclo compounds far more practical.

Furthermore, where ethyl alcohol is employed as the solvent there is a strong tendency for unreacted diamine to coprecipitate with the 1,3-diazacyclo compound, which is highly objectionable.

We have now found that in the production of 1,3-diazacyclo compounds wherein an aldehyde is reacted with an N,N'-mono-substituted polymethylene diamine, the reaction may be effected without the use of organic solvents if the N,N'-mono-substituted polymethylene diamine is dispersed with the aid of a suitable dispersing agent in an aqueous medium so as to form a stable emulsion and the reaction then effected by adding the aldehyde to the emulsion, and maintaining the resulting mixture at reaction temperature until the condensation reaction is completed.

The 1,3-diazacyclo compounds formed in accordance with our novel process have the following general formula:

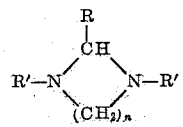

wherein R may be a hydrogen, an alkyl, aryl or substituted aryl group and R' a cycloalkyl, alkaryl, aryl or substituted aryl group and $n$ an integer of at least 2. The R' groups in the above formula may be the same or different substituents. More particularly R may be an alkyl group such as a methyl, ethyl, propyl, butyl, isobutyl or amyl group, for example, or an aryl group such as a phenyl or tolyl group, while R' may be a cycloalkyl group such as cyclohexyl, or a benzyl, phenyl, tolyl, ethyl phenyl, chlorphenyl, anisyl, phenetyl or acetanilido group, for example.

As examples of N,N'-mono-substituted polymethylene diamines which may be employed there may be mentioned diphenyl ethylene diamine, dibenzyl ethylene diamine, dicyclohexyl ethylene diamine, ditolyl propylene diamine, diphenyl trimethylene diamine, diphenyl tetramethylene diamine and diphenyl pentamethylene diamine. Suitable aldehydes are, for example, formaldehyde, acetaldehyde, propionaldehyde, butyraldehyde, amyl aldehyde, benzaldehyde, tolylaldehyde, aldol, etc.

The aqueous emulsion of the N,N'-mono-substituted polymethylene diamine is preferably formed by adding the diamine to water containing the desired dispersing or emulsifying agent together with a stabilizer and then agitating the resulting aqueous mixture until the diamine is dispersed and a stable emulsion formed. If the diamine is normally a solid at ordinary temperatures, the aqueous mixture is heated to the melting point of the diamine and the melted diamine, now in liquid form, then dispersed with agitation. Where the diamine employed has a melting point about 100° C. the diamine may be melted by heating with water in a pressure vessel until the diamine is liquefied and the emulsion formed by suitable agitation of the mixture of amine and aqueous solution of the dispersing or emulsifying agent. The emulsion is preferably maintained at a reaction temperature of from about 70 to about 90° C. during the addition of the aldehyde and until the condensation reaction is completed.

Emulsifying agents such as sodium lignosulfonate, aryl alkyl sulfonates or sulfated long chain fatty alcohols, for example, are suitable and the emulsifying agent is preferably employed in an amount of from 3 to 10% by weight on the weight of the diamine. The emulsion also preferably contains a stabilizing agent. When sodium lignosulfonate is employed as the emulsifying agent, the emulsion is preferably stabilized with potassium pyrophosphate. Other stabilizing agents which comprise neutral or alkaline salts of the alkali metals may be used such as, for example, sodium pyrophosphate, sodium sulfate, sodium carbonate, sodium tetraborate, trisodium phosphate or sodium silicate.

In accordance with our novel process, 1,3-diazacyclo compounds such as, for example:

1,3-di-p-chlorphenyl-imidazolidine
1,3-di-p-tolyl-imidazolidine
1,3-dicyclohexyl-imidazolidine
1,3-diphenyl-2-methyl-imidazolidine
1,3-diphenyl-2-ethyl-imidazolidine
1,2,3-triphenyl-imidazolidine
1,3-dibenzyl-2-methyl-imidazolidine
1,3-dibenzyl-2-butyl-imidazolidine
1-phenyl-3-p-tolyl-imidazolidine
1,3-di-p-tolyl-2-ethyl-imidazolidine
1,3-di-o-tolyl-2-phenyl-imidazolidine
1,3-di-p-anisyl-imidazolidine
1,3-di-p-anisyl-2-ethyl-imidazolidine
1,3-di-p-phenetyl-imidazolidine
1,3-di-p-phenetyl-2-methyl-imidazolidine
1,3-di-p-phenetyl-2-propyl-imidazolidine
1,3-diphenyl-hexahydropyrimidine
1,3-di-p-tolyl-hexahydropyrimidine
1,3-dibenzyl-hexahydropyrimidine
1,3-di-p-tolyl-2-ethyl-hexahydropyrimidine may be obtained.

In order further to illustrate our invention but without being limited thereto the following examples are given:

Example I

A mixture of 5 parts by weight of N,N'-diphenylethylenediamine, 0.5 part by weight of sodium lignosulfonate and 0.5 part by weight of potassium pyrophosphate in 200 parts by weight of water heated to 90° C. is beaten until the particle size of the liquid amine is reduced to about 10 microns and a stable emulsion formed. The temperature of the emulsion obtained is reduced to about 75° C. and about 3 parts by weight of 40% aqueous formaldehyde added with stirring. Stirring is continued for about 3 hours at 75° C. and the reaction mixture then cooled to 25° C., filtered, washed with water and dried. A yield of 91% of theoretical is obtained of a light tan powder melting at 119 to 121° C. The product comprises 1,3-diphenylimidazolidine.

Example II

A mixture of 5 parts by weight of N,N'-diphenylethylenediamine, 0.5 part by weight of sodium lignosulfonate and 0.5 part by weight of potassium pyrophosphate in 200 parts by weight of water heated to 90° C. is beaten until the particle size of the liquid amine is reduced to about 10 microns and a stable emulsion formed. The temperature of the emulsion obtained is reduced to about 75° C. and about 1.5 parts by weight of acetaldehyde added with stirring. Stirring is continued for about 3 hours at 75° C. and the reaction mixture then cooled to 25° C., filtered, washed with water and dried. A yield of 93% of theoretical is obtained of a light tan powder melting at 98 to 100° C. The product comprises 1,3-diphenyl-2-methylimidazolidine.

Example III

A mixture of 5 parts by weight of N,N'-diphenylethylenediamine, 0.5 part by weight of sodium lignosulfonate and 0.5 part by weight of potassium pyrophosphate in 200 parts by weight of water heated to 90° C. is beaten until the particle size of the liquid amine is reduced to about 10 microns and a stable emulsion formed. The temperature of the emulsion is maintained at 90° C. and about 3.75 parts by weight of benzaldehyde added with stirring. Stirring is continued for about 3 hours at 90° C. and the reaction mixture then cooled to 25° C., filtered, washed with water and dried. A yield of 90% of theoretical is obtained of a light tan powder melting at 133–135° C. The product comprises 1,2,3-triphenylimidazolidine.

It is to be understood that the foregoing detailed description is given merely by way of illustration and that many variations may be made therein without departing from the spirit of our invention.

Having described our invention, what we desire to secure by Letters Patent is:

1. Process for the production of 1,3-diazacyclo compounds of the formula

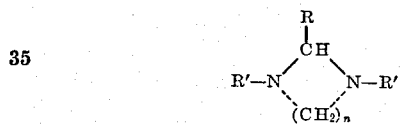

wherein R is a member of the group consisting of hydrogen, alkyl, aryl and substituted aryl groups, R' is a member of the group consisting of cycloalkyl, alkaryl, aryl and substituted aryl groups and $n$ is an integer of at least 2, which comprises adding an aldehyde of the formula R—CHO to a stable, aqueous emulsion of a polymethylene diamine of the formula R'—NH—(CH$_2$)$_n$—NH—R' dispersed with a dispersing agent and maintaining the reaction mixture at reaction temperature until the condensation is completed.

2. Process for the production of 1,3-diazacyclo compounds of the formula

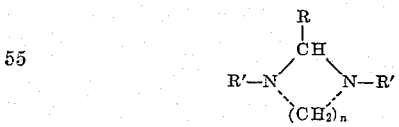

wherein R is a member of the group consisting of hydrogen, alkyl, aryl and substituted aryl groups, R' is a member of the group consisting of cycloalkyl, alkaryl, aryl and substituted aryl groups and $n$ is an integer of at least 2, which comprises adding an aldehyde of the formula R—CHO to a stable, aqueous emulsion of a polymethylene diamine of the formula R'—NH—(CH$_2$)$_n$—NH—R' dispersed with a dispersing agent and stabilized with a member of the group consisting of potassium pyrophosphate, sodium pyrophosphate, sodium sulfate, sodium carbonate, sodium tetraborate, trisodium phosphate and sodium silicate and maintaining the reaction mixture at reaction temperature until the condensation is completed.

3. Process for the production of 1,3-diazacyclo compounds of the formula

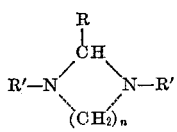

wherein R is a member of the group consisting of hydrogen, alkyl, aryl and substituted aryl groups, R' is a member of the group consisting of cycloalkyl, alkaryl, aryl and substituted aryl groups and $n$ is an integer of at least 2, which comprises adding an aldehyde of the formula R—CHO to a stable, aqueous emulsion of a polymethylene diamine of the formula $$R'—NH—(CH_2)_n—NH—R'$$

emulsified with sodium lignosulfonate and stabilized with potassium pyrophosphate and maintaining the reaction mixture at reaction temperature until the condensation is completed.

4. Process for the production of 1,3-diphenylimidazolidine, which comprises adding formaldehyde to a stable, aqueous emulsion of N,N'-diphenyl ethylene diamine, and maintaining the reaction mixture at reaction temperature until the formation of 1,3-diphenylimidazolidine is completed.

5. Process for the production of 1,3-diphenyl-2-methyl imidazolidine, which comprises adding acetaldehyde to a stable, aqueous emulsion of N,N'-diphenyl ethylene diamine, and maintaining the reaction mixture at reaction temperature until the formation of 1,3-diphenyl-2-methyl-imidazolidine is completed.

6. Process for the production of 1,2,3-triphenyl-imidazolidine, which comprises adding benzaldehyde to a stable, aqueous emulsion of N,N'-diphenyl ethylene diamine, and maintaining the reaction mixture at reaction temperature until the formation of 1,2,3-triphenyl-imidazolidine is completed.

7. Process for the production of 1,3-diphenyl-imidazolidine, which comprises adding formaldehyde to a stable, aqueous emulsion of N,N'-diphenyl ethylene diamine emulsified with sodium lignosulfonate, and maintaining the reaction mixture at reaction temperature until the formation of 1,3-diphenyl-imidazolidine is completed.

8. Process for the production of 1,3-diphenyl-imidazolidine, which comprises adding formaldehyde to a stable, aqueous emulsion of N,N'-diphenyl ethylene diamine emulsified with sodium lignosulfonate and stabilized with potassium pyrophosphate, and maintaining the reaction mixture at reaction temperature until the formation of 1,3-diphenylimidazolidine is completed.

9. Process for the production of 1,3-diphenyl-2-methyl-imidazolidine, which comprises adding acetaldehyde to a stable, aqueous emulsion of N,N'-diphenyl ethylene diamine emulsified with sodium lignosulfonate and stabilized with potassium pyrophosphate, and maintaining the reaction mixture at reaction temperature until the formation of 1,3-diphenyl-2-methyl-imidazolidine is completed.

10. Process for the production of 1,2,3-triphenyl-imidazolidine, which comprises adding benzaldehyde to a stable, aqueous emulsion of N,N'-diphenyl ethylene diamine emulsified with sodium lignosulfonate and stabilized with potassium pyrophosphate, and maintaining the reaction mixture at reaction temperature until the formation of 1,2,3-triphenyl-imidazolidine is completed.

11. Process for the production of 1,3-diphenyl-imidazolidine, which comprises adding formaldehyde to a stable, aqueous emulsion of N,N'-diphenyl ethylene diamine emulsified with 3 to 10% by weight of sodium lignosulfonate on the weight of the diamine, and maintaining the reaction mixture at reaction temperature until the formation of 1,3-diphenylimidazolidine is completed.

12. Process for the production of 1,3-diphenyl-imidazolidine, which comprises adding formaldehyde to a stable, aqueous emulsion of N,N'-diphenyl ethylene diamine emulsified with 3 to 10% by weight of sodium lignosulfonate on the weight of the diamine and stabilized with 3 to 10% by weight of potassium pyrophosphate on the weight of the diamine, and maintaining the reaction mixture at a reaction temperature of about 75° C. until the formation of 1,3-diphenylimidazolidine is completed.

13. Process for the production of 1,3-diphenyl-2-methyl-imidazolidine, which comprises adding acetaldehyde to a stable, aqueous emulsion of N,N'-diphenyl ethylene diamine emulsified with 3 to 10% by weight of sodium lignosulfonate on the weight of the diamine and stabilized with 3 to 10% by weight of potassium pyrophosphate on the weight of the diamine, and maintaining the reaction mixture at a reaction temperature of about 75° C. until the formation of 1,3-diphenyl-2-methyl-imidazolidine is completed.

14. Process for the production of 1,2,3-triphenyl-imidazolidine, which comprises adding benzaldehyde to a stable, aqueous emulsion of N,N'-diphenyl ethylene diamine emulsified with 3 to 10% by weight of sodium lignosulfonate on the weight of the diamine and stabilized with 3 to 10% by weight of potassium pyrophosphate on the weight of the diamine, and maintaining the reaction mixture at a reaction temperature of about 90° C. until the formation of 1,2,3-triphenyl-imidazolidine is completed.

VICTOR S. SALVIN.
JOHN R. ADAMS, Jr.

REFERENCES CITED

The following references are of record in the file of this patent:

UNITED STATES PATENTS

| Number | Name | Date |
|---|---|---|
| 2,265,051 | Adams | Dec. 2, 1941 |
| 2,276,309 | Hummel | Mar. 17, 1942 |
| 2,416,042 | Brooks | Feb. 18, 1947 |